US006179365B1

(12) United States Patent
Hennessey (10) Patent No.: US 6,179,365 B1
(45) Date of Patent: Jan. 30, 2001

(54) HEAD IMPACT ENERGY ABSORBING SUN VISOR PIVOT ROD ELBOW COVER

(76) Inventor: William J. Hennessey, 43067 W. Kirkwood Dr., Clinton Township, MI (US) 48038

( * ) Notice: Under 35 U.S.C. 154(b), the term of this patent shall be extended for 0 days.

(21) Appl. No.: 09/293,598

(22) Filed: Apr. 16, 1999

(51) Int. Cl.[7] .................................................. B60J 3/00
(52) U.S. Cl. ............................................. 296/97.9; 16/250
(58) Field of Search ................................ 296/97.9, 97.1; 16/250

(56) References Cited

U.S. PATENT DOCUMENTS

| 2,304,223 | * | 12/1942 | Westrope | 296/97.9 |
|---|---|---|---|---|
| 2,446,866 | * | 8/1948 | Bell | 296/97.9 |
| 2,518,766 | * | 8/1950 | Exner | 296/97.9 |
| 3,252,179 | * | 5/1966 | Watson | 16/250 |
| 4,273,359 | | 6/1981 | Scholz et al. . | |
| 4,660,852 | | 4/1987 | Katayama et al. . | |
| 4,989,911 | * | 2/1991 | Van Order | 296/97.9 |
| 5,031,954 | * | 7/1991 | Peterson et al. | 296/97.9 |
| 5,056,853 | * | 10/1991 | Van Order | 296/97.9 |
| 5,061,005 | * | 10/1991 | Van Order et al. | 296/97.9 |
| 5,397,088 | | 3/1995 | White . | |
| 5,544,927 | * | 8/1996 | Snyder et al. | 296/97.9 |
| 5,564,744 | | 10/1996 | Frost . | |
| 5,765,897 | * | 6/1998 | Snyder et al. | 296/97.9 |
| 5,779,270 | | 7/1998 | Tanaka . | |
| 5,855,408 | * | 1/1999 | Rickabus | 296/97.1 |
| 6,003,928 | * | 12/1999 | Curtindale | 296/97.9 |

* cited by examiner

Primary Examiner—Joseph D. Pape
Assistant Examiner—Kiran Patel
(74) Attorney, Agent, or Firm—Peter D. Keefe (57) ABSTRACT

A pivot rod elbow cover for covering the elbow of a sun visor pivot rod which protects occupants from head impact injury in the event of a crash, yet allows the sun visor to both pivot and rotate in a fully normal and familiar manner. The pivot rod elbow cover is composed of a base member and a cover member rotatively connected thereto. The base member is affixed to the roof of the vehicle and preferably serves as a pivot rod elbow support which allows rotation of the pivot rod elbow with respect to the roof. The cover member has a preferably hemispherical dome shape that snappingly engages the base member so as to be rotatable therewith and receives therewithin the pivot rod elbow. Internal to the cover member are left and right guide walls which serve as crush features, as well as assistance to guiding the pivot rod therewithin.

20 Claims, 8 Drawing Sheets

*Prior Art*

*Fig. 1*

*Prior Art*

HEAD IMPACT ENERGY ABSORBING SUN VISOR PIVOT ROD ELBOW COVER

BACKGROUND OF THE INVENTION

1. Field of the Invention

The present invention relates to automotive sun visors which are rotatively and pivotally mounted above the windshield. More particularly, the present invention relates to pivot rods upon which sun visors are pivotally mounted, wherein the pivot rod has an elbow which is rotatively connected to the roof of the vehicle. Still more particularly, the present invention relates to a head impact energy absorbing pivot rod elbow cover.

2. Description of the Prior Art

Federal motor vehicle standards are being continuously updated. One area of current concern is occupant safety in the event of a crash. Occupants are typically violently moved in relation to the vehicle due to the inertial forces involved in a crash. Most vulnerable is the head of the occupants. Accordingly, FMVSS 201 has recently been upgraded to include a head injury criterion (HIC). In order for vehicle manufacturers to meet the HIC, additional padding of the interior trim must be provided.

One area of the interior of the passenger compartment of a motor vehicle that is particularly dangerous in the event of a head impact is the elbow of a sun visor pivot rod. The pivot rod elbow is quite rigid, of a small cross-section rod stock which is sometimes plastic covered, and the angle is a sharp ninety degrees. An occupant whose head untowardly strikes the pivot rod elbow is likely to be injured because the energy of the impact will be delivered to a small surface area of the skull.

Figure 1:
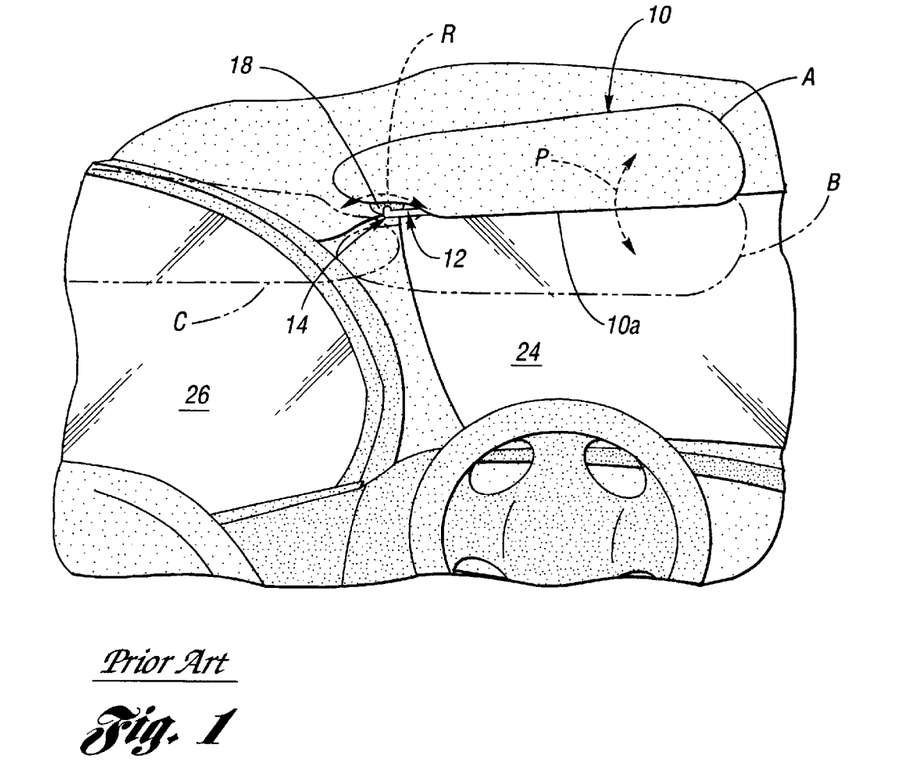
FIG. 1 is a perspective view of a portion of an automotive interior, showing a prior art sun visor pivot rod elbow mounting.
Figure 2:
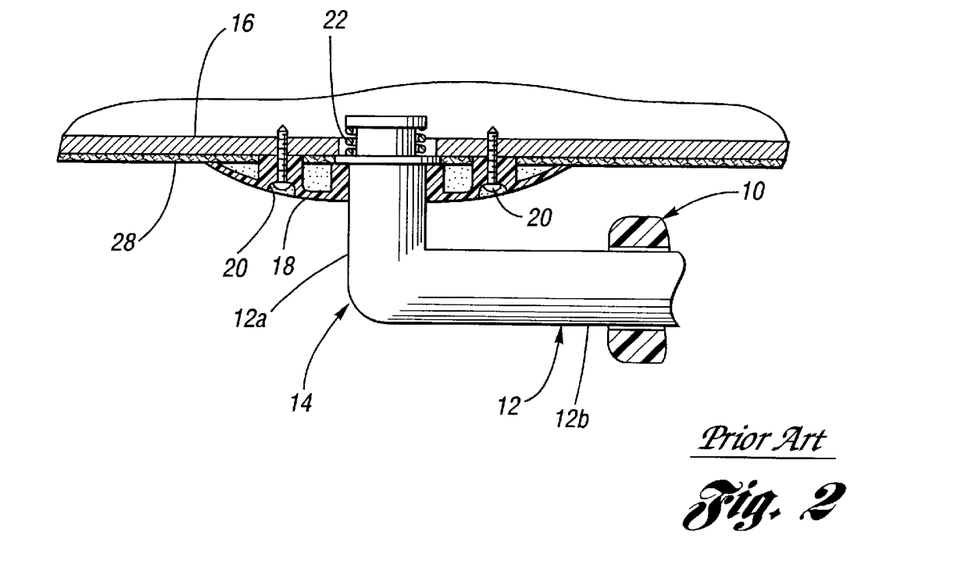
FIG. 2 is a partly sectional, detail side view of the prior art sun visor pivot rod elbow mounting.

Referring now to FIGS. 1 and 2, an example of a conventional sun visor 10 is shown. The sun visor 10 is pivotally mounted to the pain portion 12b of a pivot rod 12. As best shown at FIG. 2, the pivot rod 12 includes a ninety degree elbow 14, wherein an end portion 12a of the pivot rod 12 is rotatably mounted to the metallic roof 16 via a cap 18 which is fastened by screws 20. As an example of mounting, the end portion 12a of the pivot rod 12 is rotatably attached to a cap 18 in a spring loaded manner via a compression spring 22. The spring 22 provides frictional resistance as the elbow 14 is rotated with respect to the cap 18. There is a sun visor mounted, as described, at each of the left and right sides of the windshield 24 (only the driver-side sun visor being shown for simplification).

As can be seen at FIG. 1, the pivot rod enables an occupant of the front seat to pivot the sun visor 10 to a storage location A adjacent the headliner 28 to a deployed location B so as to selectively occlude the windshield 24 along arrow P, which pivoting may well exceed ninety degrees. Further, the rotation afforded the elbow 14 allows the pivot rod 12 with its associated sun visor 10 to be rotated from a location adjacent the windshield 24 to an auxiliary location C adjacent the adjoining side door window 26 via a rotation along arrow R, a rotation which may exceed ninety degrees.

Accordingly, what is needed in the art is coverage of the pivot rod elbow which will protect occupants from head impact injury in the event of a crash, yet allows the sun visor to both pivot and rotate in a fully normal and familiar manner.

SUMMARY OF THE INVENTION

The present invention is an elbow cover for covering the elbow of a sun visor pivot rod which protects occupants from head impact injury in the event of a crash, yet allows the sun visor to both pivot and rotate in a fully normal and familiar manner.

The pivot rod elbow cover according to the present invention is composed of a base member and a cover member. The base member is affixed to the roof of the vehicle and preferably serves as a pivot rod elbow support which allows rotation of the pivot rod elbow with respect to the roof. The cover member snappingly engages the base member so as to be rotatable therewith and receives therewithin the pivot rod elbow. The cover member has an exterior surface of which provides head impact energy absorbance over an area much larger than that which would otherwise be the case with respect to the pivot rod elbow when uncovered by the cover member.

The base member is provided with a central aperture and a plurality of mounting holes (eg., two screw holes). The base member further has a perimeter and a plurality of resilient upstanding tabs situated at the perimeter. Each tab curvably follows the curvature of the adjoining perimeter, and is characterized by a lower chamfer, and upper chamfer and a apex therebetween, wherein the apex is disposed radially outward in relation to the perimeter.

The cover member has an internal annular slot for receiving therein the upper and lower chamfers of the tabs, wherein the apex slidably abuts the slot sidewall. In this regard, the resiliency of the tabs, coupled with the upper chamfer allow the cover member to snap lockingly onto the tabs and the tabs to be slidingly movable all along the annular slot.

The cover member, in one form thereof, has an exterior surface of a generally hemispherical dome shape, having a portal which may or may not be defined by a flat-faced portal arch; and in another form thereof, has an exterior surface of a generally curvaceous shape with a flat-faced portal. Internally, the cover member has an interior hollow space defined by an interior surface, and is provided with left and right guide walls which are mutually parallel and straddlingly intersect the portal. A concave guide wall extends between the left and right guide walls, and is located centrally relative to the annular slot. The left and right guide walls serve not only as an optionally included extra guidance for the pivot rod (pivot rod guidance is primarily between the concave guide wall and the portal), they serve as crush features which aid impact energy absorbance in cases where the impact causes deformation of the cover wall of the cover member.

In operation, the base member is attached rotatably to the end portion of a pivot rod elbow at the central aperture, and the pivot rod is captured at the portal of the cover member. Screws then secure the base member to the roof of a vehicle. Next, the cover member is snapped onto the base member, wherein the end portion of the pivot rod elbow abuts the concave guide wall and is located centrally with respect to the annular sidewall of the cover member and the perimeter of the base member. The pivot rod side of the pivot rod elbow is guided between the left and right guide walls and exits at the portal.

An occupant can now pivot the sun visor on the pivot rod in the normal manner. Further, the occupant can rotate the sun visor to the adjoining side door window, in that while the base portion cannot move, the cover portion is rotatable with the pivot rod elbow as the sun visor is rotated in the normal manner.

In the unfortunate event of a crash, should the occupant be thrown forwardly in a collision course toward the pivot rod elbow, the cover member will absorb the energy of the head impact over a sufficiently large area to limit the likelihood of head impact injury. In the event of the head impact that is so great as to deform or crush the cover member, the left and right guide walls will serve as crush features that absorb impact energy.

Accordingly, it is an object of the present invention to provide a head impact energy absorbing cover for a pivot rod elbow of a sun visor.

It is a further object of the present invention to provide a head impact energy absorbing cover for a pivot rod elbow of a sun visor, wherein the sun visor is both pivotable and rotatable.

These, and additional objects, advantages, features and benefits of the present invention will become apparent from the following specification.

DETAILED DESCRIPTION OF THE PREFERRED EMBODIMENT

Referring now to FIGS. 3 through 15, the pivot rod elbow cover according to the present invention will be described, wherein FIGS. 3 through 10b depict a first form of the pivot rod elbow cover 100, and FIGS. 11 through 15 show a second form of the pivot rod elbow cover 100'.

Figure 3:
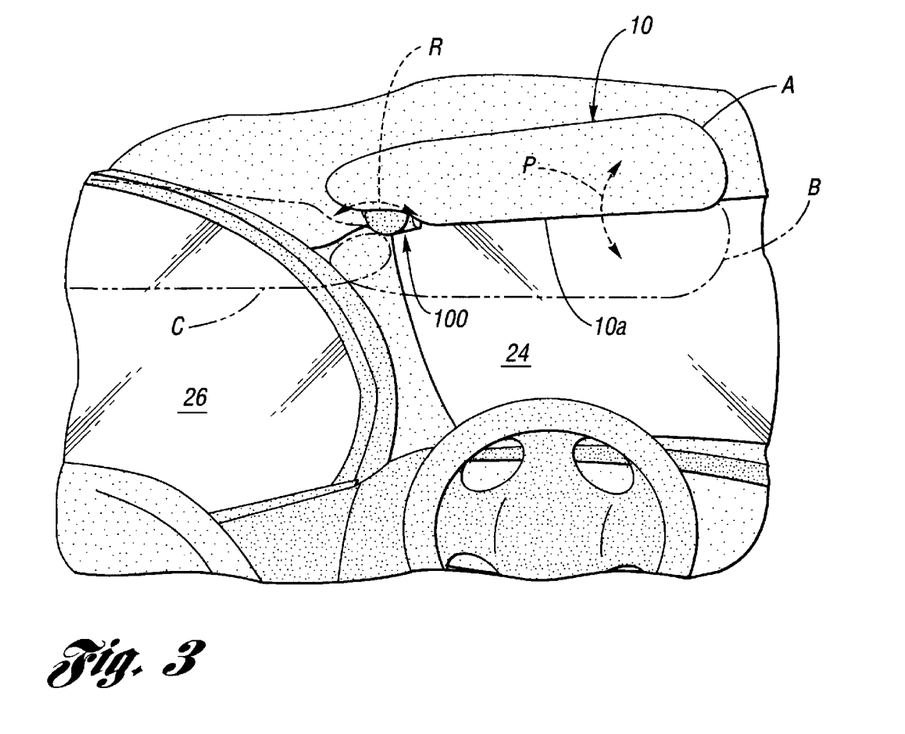
FIG. 3 is a perspective view of a portion of an automotive interior, showing the sun visor pivot rod elbow cover according to the present invention.
Figure 4:
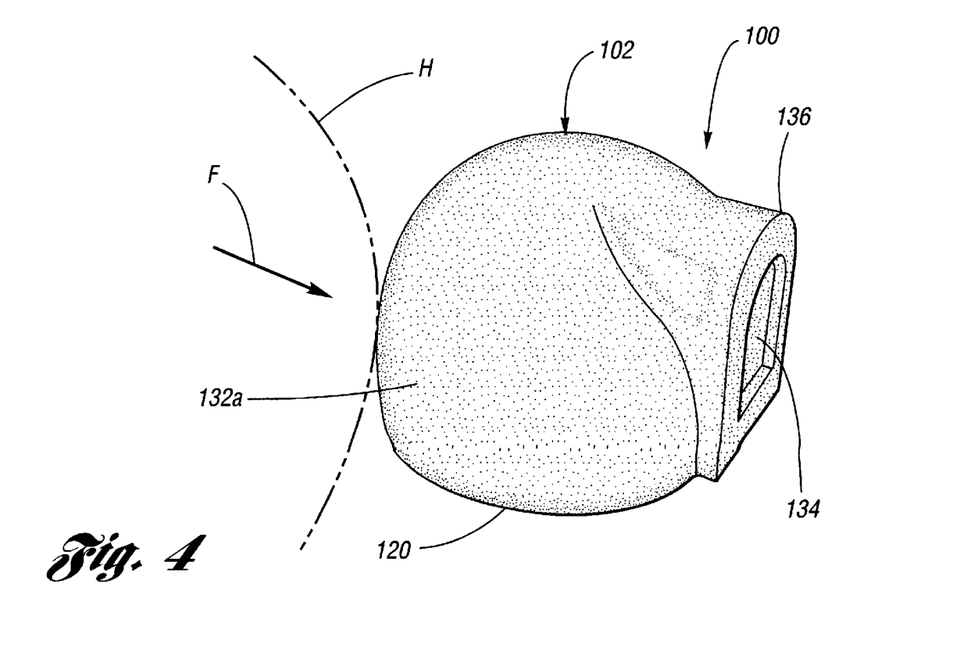
FIG. 4 is a perspective view of the pivot rod elbow cover according to the present invention.

As can be understood by simultaneous reference to FIGS. 3 and 4, the pivot rod elbow cover 100 includes a cover member 102 having, preferably, a generally hemispherical dome shape. The pivot rod elbow cover 100 receives the conventional elbow 14 of a conventional pivot rod 12 of a conventional sun visor 10. In this regard, the sun visor 10 is conventionally pivotally mounted on the main portion 12b of the pivot rod 12, so as to be conventionally pivotal from adjacent the headliner 28 (at location A) to adjacent the windshield 24 (at location B, shown in phantom) along arrow P. Further in this regard, the pivot rod elbow cover 100 is structured to enable rotation of the elbow 14 so that the pivot rod 12 and its associated sun visor 10 are conventionally rotatable from adjacent the windshield 24 to adjacent the adjoining side door window 26 (at auxiliary location C, shown in phantom) along arrow R.

As can be understood from FIG. 4, the large diameter of the cover member 102, on the order for example of about 2 and one-half inches, affords a radius of curvature of the exterior surface 132a thereof which is much larger than that of a naked pivot rod elbow 14. Accordingly, in the event of a crash, an occupant whose head H is propelled forcibly in a direction F against the pivot rod elbow cover 100, would be far less likely to be injured because of the large contact area of the exterior surface 132a, as compared to a naked pivot rod elbow 14, which has a small contact area because of its much smaller radius of curvature, as well as the compounded danger associated with its rather sharply defined ninety degree bend.

Referring now additionally to FIGS. 5 through 10b, the structure and function of the pivot rod elbow cover 100 will be further detailed, wherein it will be noted that the pivot rod elbow cover further includes a base member 104.

Figure 6:
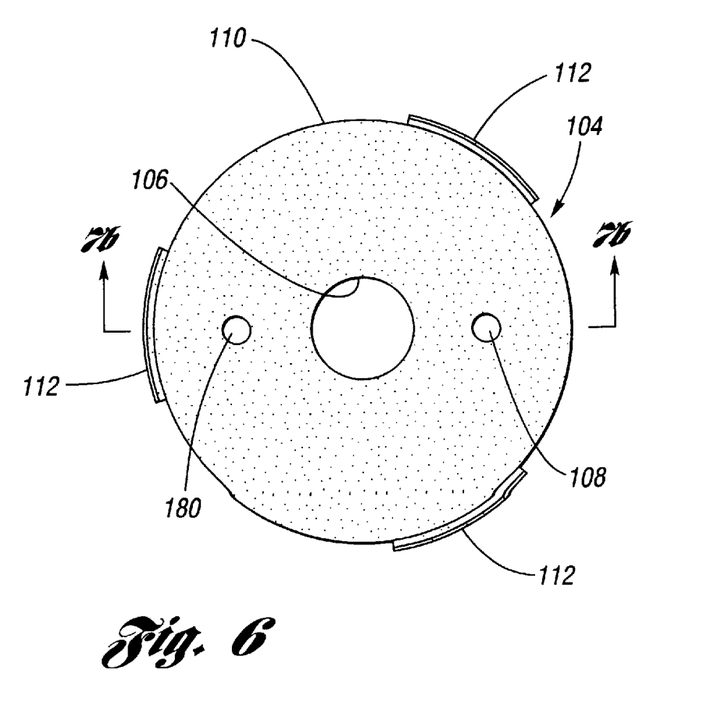
FIG. 6 is a top plan view of a base member of the pivot rod elbow cover according to the present invention.
Figure 7A:
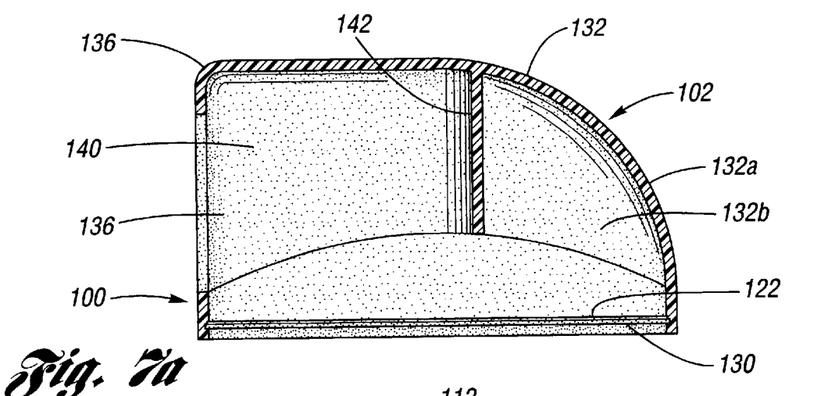
FIG. 7a is a partly sectional view of the cover member, seen along line 7a—7a in FIG. 5.
Figure 7B:
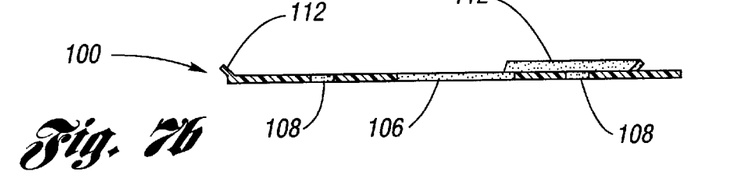
FIG. 7b is a partly sectional side view of the base member, seen along line 7b—7b in FIG. 6.

The base member 104 has a central aperture 106 and a pair of mounting holes 108. The base member 104 has a circular perimeter 110. A plurality of resilient upstanding tabs 112 are located at the perimeter 110, three tabs being shown by way of preference. Each tab 112 curvably follows the circular curvature of the adjoining perimeter 110. Each tab 112 has a lower chamfer 114, an upper chamfer 116 and an apex 118 situated therebetween, wherein the apex is disposed radially outward in relation to the perimeter 110. The interface of each tab 112 with the base member provides a resiliency such that each tab may be moved radially inwardly when exposed to a firmly applied force, and will thereafter return to its original shape. A preferred material of composition of the base member is plastic, but a metal or another structurally strong material may be substituted.

Figure 5:
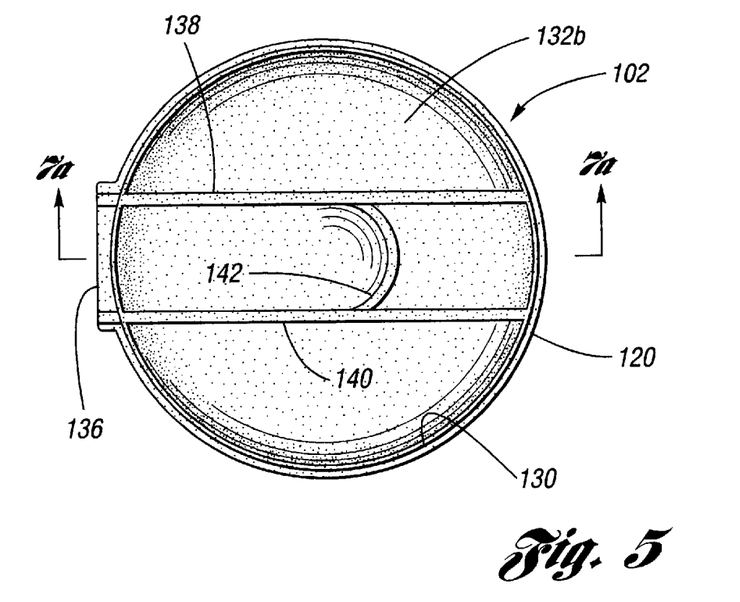
FIG. 5 is a bottom plan view of a cover member of the pivot rod elbow cover according to the present invention.

The cover member 102 is preferably composed of plastic, which may be decorated to match the color and look of the passenger compartment interior decor, and although the aforesaid hemispherical dome shape is preferred, this may be modified by bevels or other pleasingly fanciful shapes provided no sharp corners are created which would raise head impact injury concerns.

Adjacent the equatorial terminus 120 of the cover member 102, an internal annular slot 122 is formed for receiving therein the upper and lower chamfers 116, 114 of the tabs 112, wherein the apex 118 slidably abuts the slot sidewall 124. In this regard, when the base member 104 is aligned with the equitorial terminus 120 and then pushed into the cover member 102, the resiliency of the tabs 112, coupled with the upper chamfer 116 provide snap lockingly of the tabs into the annular slot 122, wherein the base member is rotatable with respect to the cover member as the tabs slide along the annular slot. The resiliency of the tabs 112, coupled with the lower chamfer 114 provide snap unlockingly of the tabs out of the annular slot 122, which allows for easy disassembly.

Figures 9, 10A, 10B:
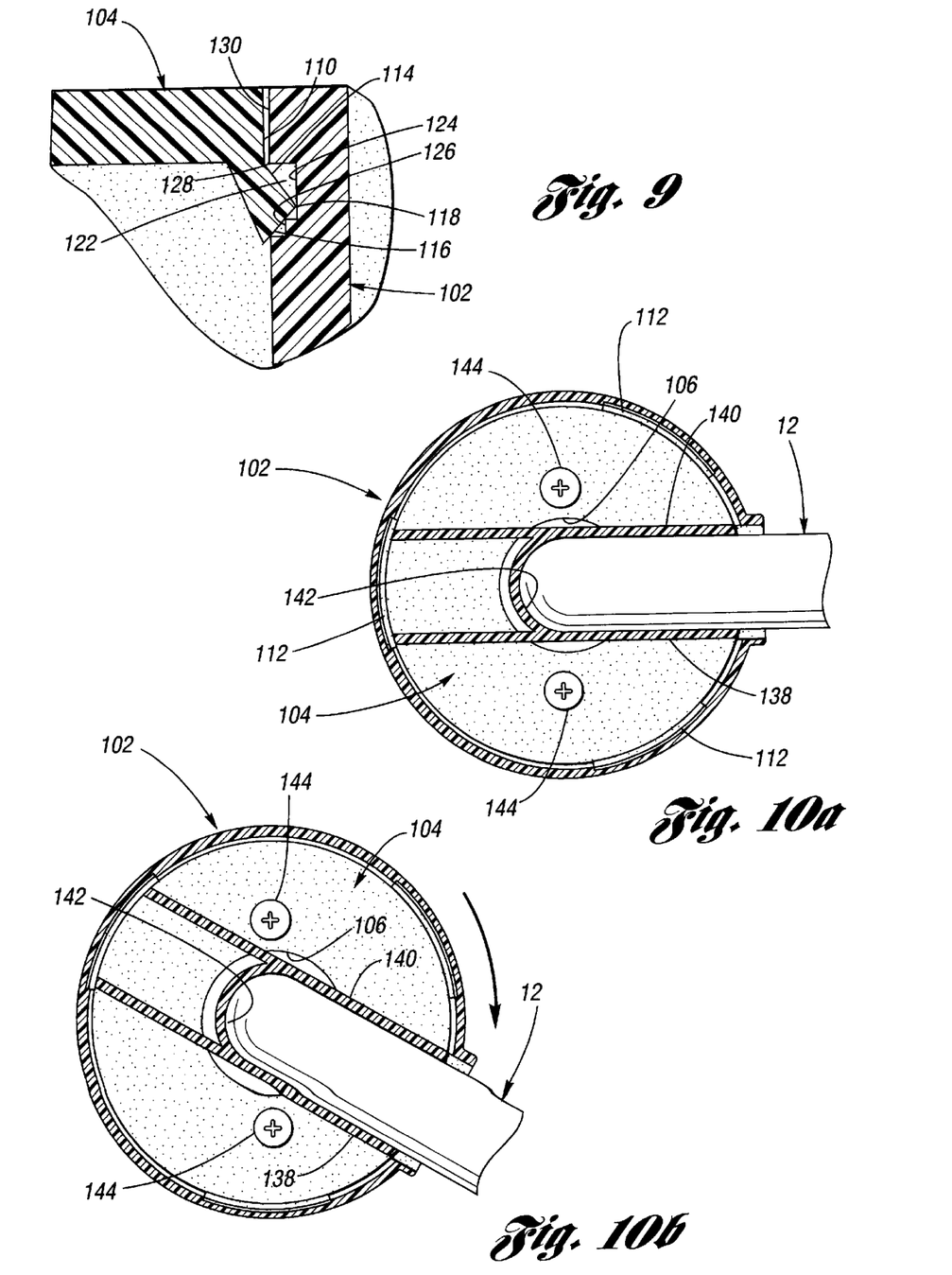
FIG. 9 is a detail, partly sectional view of a snapping interface between the base member and the cover member, as seen at circle 9 of FIG. 8.
FIG. 10a is a partly sectional top view of the pivot rod elbow cover shown in operation with a pivot rod, wherein a portion of the cover member is cut-away, and wherein the pivot rod is at a first location.
FIG. 10b is a partly sectional top view of the pivot rod elbow cover shown in operation with a pivot rod, wherein a portion of the cover member is cut-away, and wherein the pivot rod is now rotated to a second location.

The nature of a preferred interface of the tabs 112 in the annular slot 122 is shown at FIG. 9. It will be noted that the annular slot 122 is recessed from the equitorial terminus 120 so that the base member 104 is flush with the equitorial terminus when the tabs 112 are received into the annular slot 122. A preferred form of the annular slot 112 includes a stair-step 126 which abuts the upper chamfer 116. As was earlier noted, the apex 118 abuts the slot sidewall 124. Further the lower chamfer 114 abuts the slot corner 128. Additionally, it will be noted that there is a small spacing (to facilitate relative rotation without binding) between the perimeter 110 of the base member 104 and the inner periphery 130 of the cover member 102 at the equitorial terminus 120.

The interior surface 132b of the cover wall 132 of the cover member 102 is a concave reciprocal of the convex hemispherical dome shape of the exterior surface 132a. A portal 134 is formed through the cover wall 132. The portal 134 may be defined by a flat-faced portal arch 136, as shown, or by another configuration, such as for a preferably example, a shape which more smoothly merges to the convexity of the hemispherical dome shape. The portal 134 may be circular or, as shown, may be elongated to universally accommodate variously elongated pivot rod end portions 12a.

Internally to the cover member 102, mutually parallel left and right guide walls 138, 140 are connected at both ends thereof to opposing locations of the interior surface 132b, wherein the center of the inner periphery 130 is located equidistantly therebetween and the left and right guide walls are aligned directly with the portal in straddling relation thereto. A concave guide wall 142 extends between the left and right guide walls 138, 140, and the curvature thereof is located concentrically relative to the inner periphery 130. The left and right guide walls 138, 140 serve not only as an optionally included extra guidance for the pivot rod (pivot rod guidance is primarily between the concave guide wall 142 and the portal 134), they serve as rush features which aid impact energy absorbance in cases where the impact causes deformation of the cover wall 132 of the cover member 102.

Figure 8:
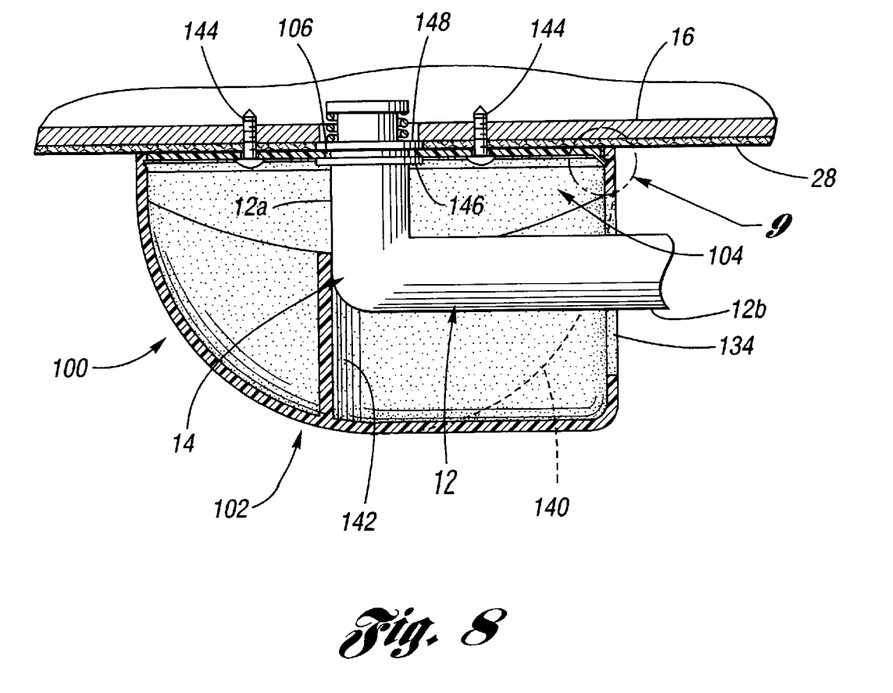
FIG. 8 is a partly sectional, detail side view of the pivot rod elbow cover, shown in operation mounting a sun visor pivot rod to the roof of an automobile.

Operation will now be described with particular attention being directed to FIG. 8.

The base member 104 is attached rotatably to the end portion of a pivot rod elbow 14 at the central aperture 106. By way of exemplification, the end portion 12a of the pivot rod 12 has a slot and trapped washer 146 at one side of the central aperture, and a spring loaded washer 148 at tie other side of the central aperture, wherein spring pressure generates a desired degree of resistance to rotation of the pivot rod elbow in relation to the base member. Other structural interfaces of the base member 104 with respect to the roof and the pivot rod may be utilized, depending on the application involved. Indeed, the pivot rod may be rotatably attached to the roof via an appropriately configured bracket, and the base member may be connected to the bracket. The pivot rod 12 is captured at the portal 134 of the cover member 102.

Screws 144 then secure the base member to the roof 16 of a vehicle, squeezing any intervening headliner 28. Next, the cover member is snapped onto the base member, wherein the tabs 112 resiliently snap into the annular slot 122, as described hereinabove. Now, the end portion 12a of the pivot rod 12 abuts the concave guide wall and is axially positioned centrally with respect to the inner periphery of the cover member and the perimeter of the base member. The main portion 12b of the pivot rod is guided between the left and right guide walls and exits the cover member through the portal.

As shown at FIGS. 10a and 10b, the cover member 102 may now rotate with the pivot rod 12, yet the base member 104 remains stationary.

As shown at FIG. 3, an occupant can now pivot the sun visor on the pivot rod in the normal manner. Further, the occupant can rotate the sun visor to the adjoining side door window, in that while the base portion cannot move, the cover portion is rotatable with the pivot rod elbow as the sun visor is rotated in the normal manner.

As mentioned, in the unfortunate event of a crash, should the occupant be thrown forwardly in a collision course toward the pivot rod elbow, the exterior surface 132a of the cover member will distribute the energy of the head impact over a sufficiently large area to limit the likelihood of head impact injury; and, in the event of the head impact being is so great as to deform or crush the cover member, the left and right guide walls will serve as crush features that absorb impact energy.

Referring now to FIGS. 11 through 15, the pivot rod elbow cover 100' according to the present invention will be described, wherein like numerals to those previously used for FIGS. 1 through 10b will indicate like structural designations in FIGS. 11 through 15.

The pivot rod elbow cover 100' includes the base member 104 as was described hereinabove, and shown at FIGS. 6 and 7b. As can best be seen by FIGS. 14a and 14b, the pivot rod elbow cover 100' further includes a cover member 102' having a generally curvaceous shape. The preferred generally curvaceous shape includes a rounded nose portion 150 and a flat-faced portion 152 at the portal 134'. The portal 134' is open at the equitorial terminus 120', thereby allowing the cover member 102' to be detached fully from the pivot rod 12 when snapped off from the base member 104. The generally curvaceous shape of the cover member 102' as shown at FIGS. 11 through 15 is believed to be the most preferred cover member shape.

Figure 11:
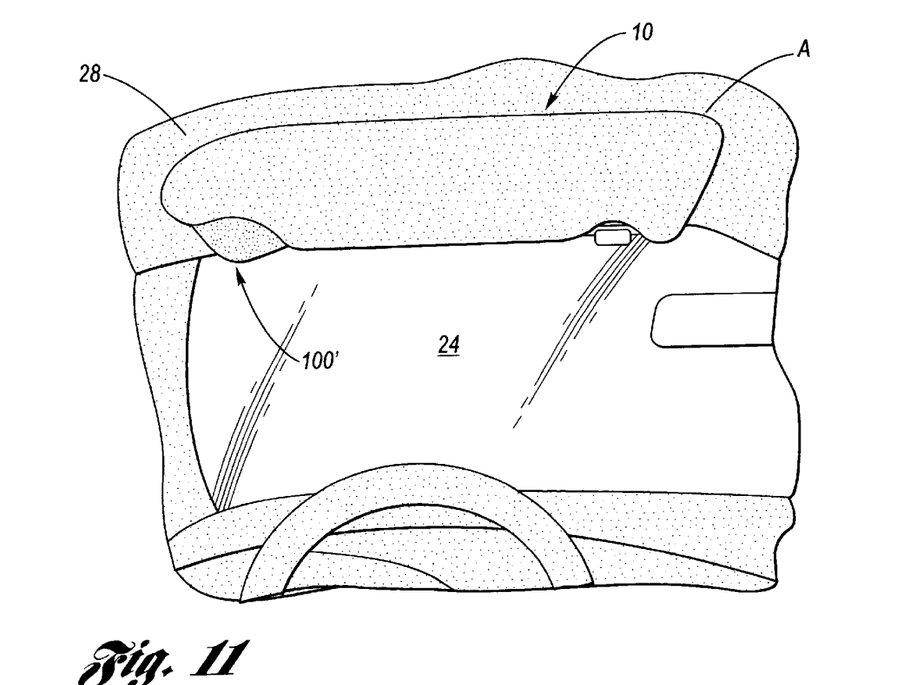
FIG. 11 is a perspective view of a portion of an automotive interior, showing the sun visor pivot rod elbow cover according a second form of the present invention, wherein the sun visor is at its storage location.
Figure 12:
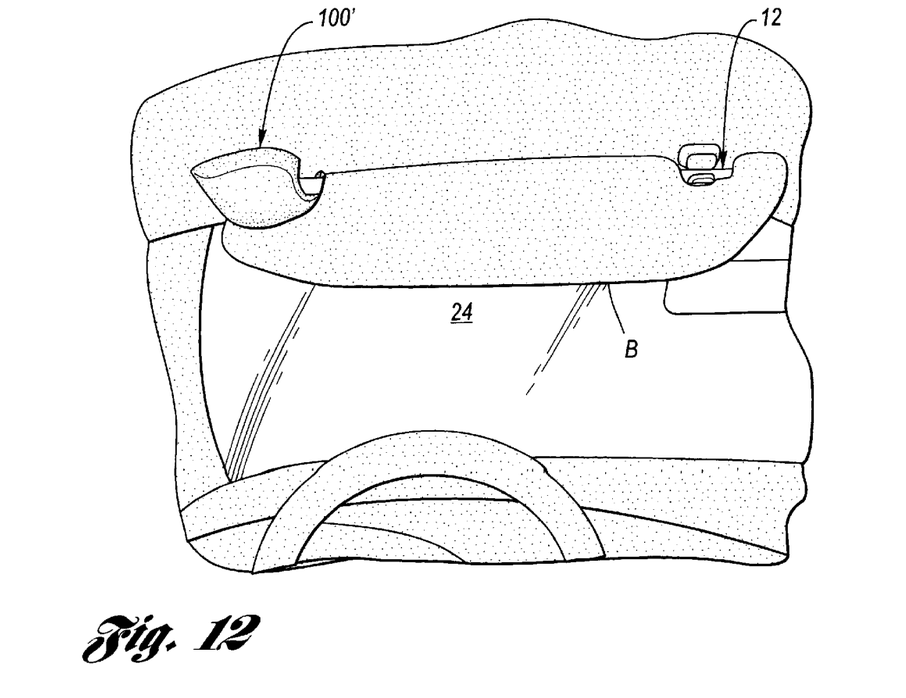
FIG. 12 is a perspective view of a portion of an automotive interior as in FIG. 11, now showing the sun visor pivoted to its deployed location adjacent the windshield.
Figure 13:
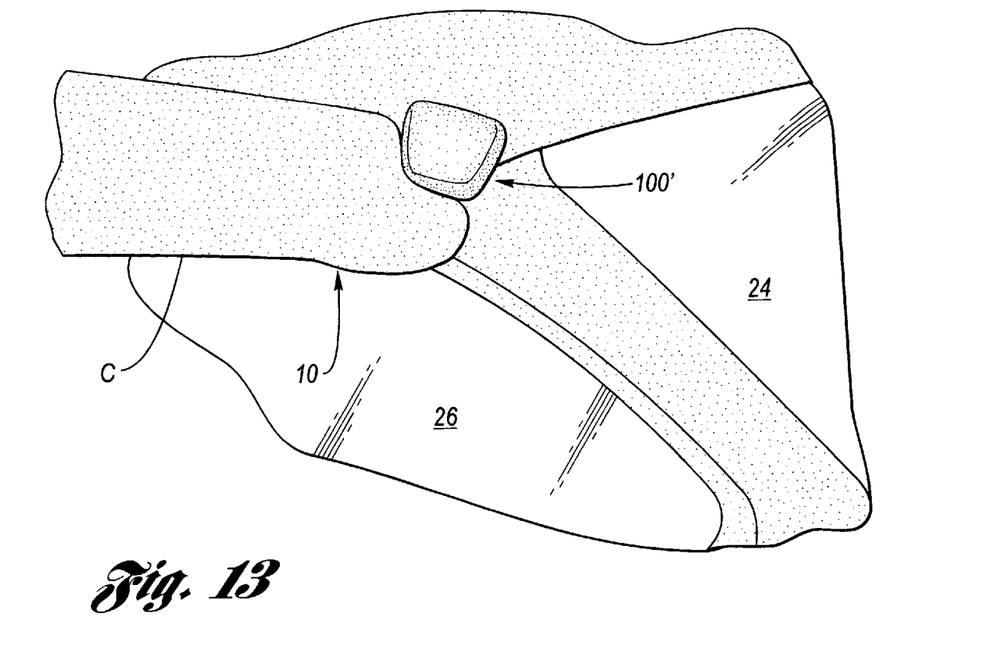
FIG. 13 is a perspective view of a portion of an automotive interior as in FIG. 11, now showing the sun visor pivoted to its auxiliary location adjacent the adjoining side door window.

Referring now to FIGS. 11 through 13, it is to be understood that the pivot rod elbow cover 100' receives the conventional elbow 14 of the conventional pivot rod 12 of the conventional sun visor 10. In this regard, the sun visor 10 is conventionally pivotally mounted on the main portion 12b of the pivot rod 12, so as to be conventionally pivotal from adjacent the headliner 28, at storage location A to adjacent the windshield 24, at deployed location B. Further in this regard, the pivot rod elbow cover 100 is structured to enable rotation of the elbow 14 so that the pivot rod 12 and its associated sun visor 10 are conventionally rotatable from adjacent the windshield 24 to adjacent the adjoining side door window 26, at auxiliary location C. By reference to FIGS. 11 through 13, it will be noted that the sun visor 10 may be configured to recessively fit with respect to the pivot rod elbow cover 100' in a most aesthetically pleasing manner.

Figure 14A:
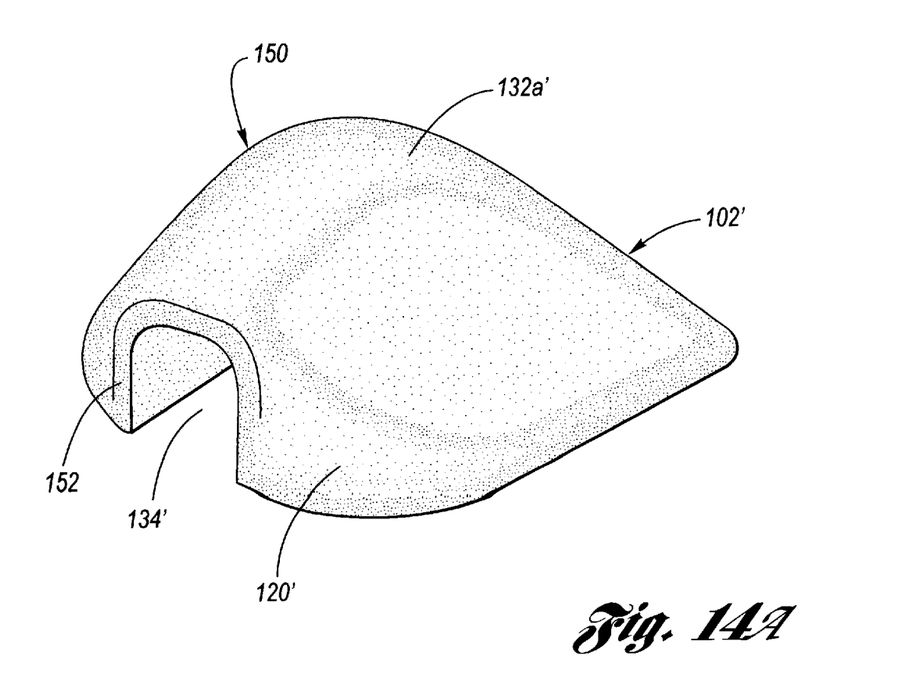
FIGS. 14a and 14b are perspective views of the pivot rod elbow cover according to the second form of the present invention.
Figure 14B:
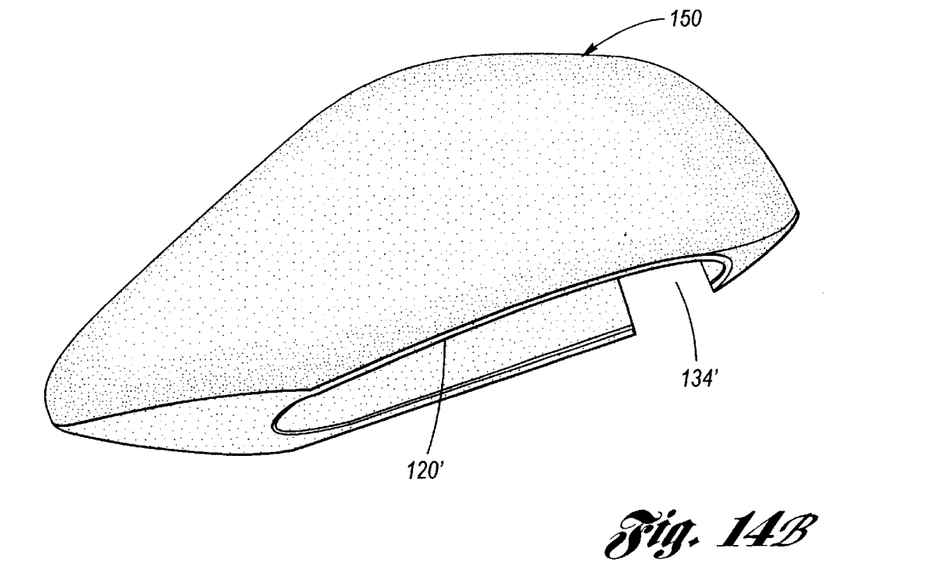

The cover member 102' is preferably composed of plastic, which may be decorated to match the color and look of the passenger compartment interior decor, and has a generally curvaceous shape without sharp corners which would raise head impact injury concerns.

Figure 15:
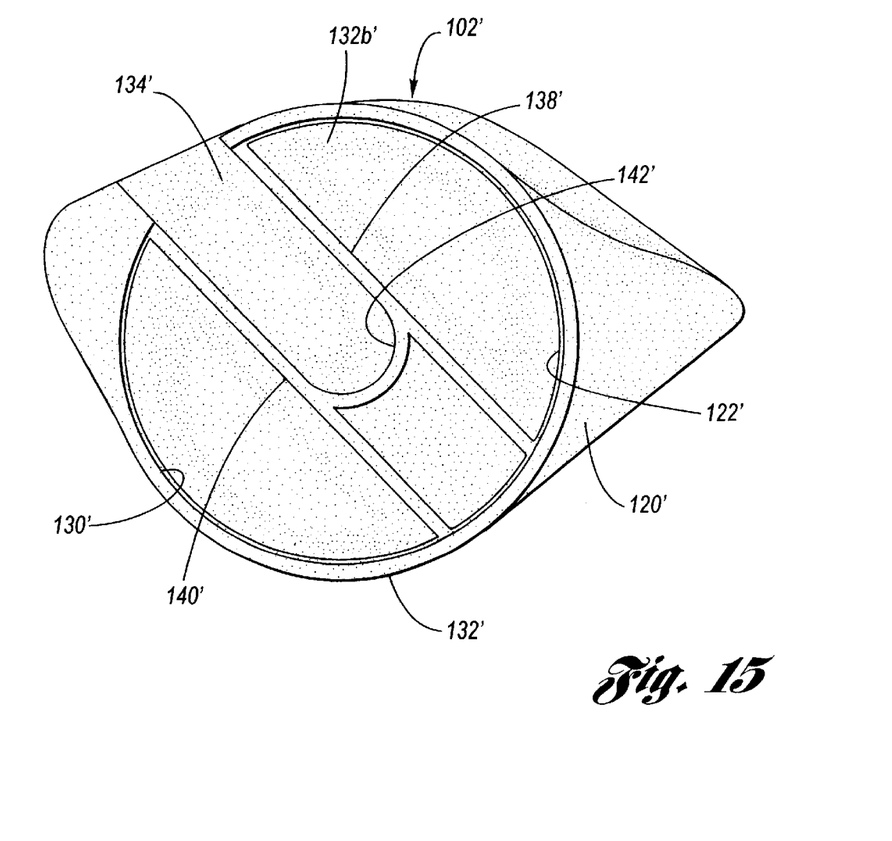
FIG. 15 is a bottom plan view of a cover member of the pivot rod elbow cover according to the second form of the present invention.

Adjacent the equatorial terminus 120' of the cover member 102', at the inner periphery 130' is the aforementioned annular slot 122'. The annular slot 122' is, as described above, formed for receiving therein the upper and lower chamfers 116, 114 of the tabs 112, wherein the apex 118 slidably abuts the slot sidewall. In this regard, when the base member 104 is aligned with the equitorial terminus 120' and then pushed into the cover member 102', the resiliency of the tabs 112, coupled with the upper chamfer 116 provide snap lockingly of the tabs into the annular slot 122', wherein the base member is rotatable with respect to the cover member as the tabs slide along the annular slot. The resiliency of the tabs 112, coupled with the lower chamfer 114 provide snap unlockingly of the tabs out of the annular slot 122', which allows for easy disassembly.

The nature of a preferred interface of the tabs 112 in the annular slot 122 was described hereinabove and is as generally shown at FIG. 9.

The interior surface 132b' of the cover wall 132' of the cover member 102' is of a generally concave shape. The portal 134' is formed through the cover wall 132' at the flat faced portion 152. The portal 132' is preferably elongated in a direction normal to the plane defined by the equitorial terminus 120' and is preferably open thereat.

Internally to the cover member 102', mutually parallel left and right guide walls 138', 140' are connected at both ends thereof to opposing locations of the interior surface 132b', wherein the center of the inner periphery 130' is located equidistantly therebetween and the left and right guide walls are aligned directly with the portal 134' in straddling relation thereto. A concave guide wall 142' extends between the left and right guide walls 138', 140', and the curvature thereof is located concentrically relative to the inner periphery 130'. The left and right guide walls 138', 140' serve not only as an optionally included extra guidance for the pivot rod (pivot rod guidance is primarily between the concave guide wall 142' and the portal 134'), they serve as crush features which aid impact energy absorbance in cases where the impact causes deformation of the cover wall 132' of the cover member 102'.

Operation will now be described for the pivot rod elbow cover 100'.

The base member 104 is attached rotatably to the end portion of a pivot rod elbow 14 at tile central aperture 106 (as was described with respect to the pivot rod elbow cover 100). Next, the pivot rod 12 is passed into the portal 134' between the left and right guide walls 138', 140', against the concave guide wall 142' and then snapped onto the base member, wherein the tabs 112 resiliently snap into the annular slot 122, as described hereinabove. Now, the end portion of the pivot rod 12 abuts the concave guide wall and is axially positioned centrally with respect to the inner periphery of the cover member and the perimeter of the base member. The main portion of the pilot rod is guided between the left and right guide walls and exits the cover member through the portal. The cover member 102' is now able to rotate with the pivot rod 12, while the base member remains positionally affixed with respect to the roof. Accordingly, an occupant can now pivot the sun visor on the pivot rod in the normal manner. Further, the occupant can rotate the sun visor to the adjoining side door window, in that while the base portion cannot move, the cover portion is rotatable with the pivot rod elbow as the sun visor is rotated in the normal manner.

As mentioned, in the unfortunate event of a crash, should the occupant be thrown forwardly in a collision course toward the pivot rod elbow, the exterior surface 132a' of the cover member 102' will distribute the energy of the head impact over a sufficiently large area to limit the likelihood of head impact injury; and, in the event of the head impact being is so great as to deform or crush the cover member, the left and right guide walls will serve as crush features that absorb impact energy.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A sun visor pivot rod elbow cover, comprising:
   a base member having a central aperture;
   a cover member having a cover wall having an exterior surf ace of a selected shape, said cover member having an equitorial terminus, said cover member having an inner periphery formed at said equitorial terminus, said cover wall having a portal formed therethrough, said cover member having an interior hollow defined by an internal surface, said cover member further having a concave guide wall connected with said inner surface in concentric relation with respect to said inner periphery; and
   means for connecting said cover member to said base member so that said cover is rotatable in relation to said base member.

2. The cover of claim 1, further comprising a crush feature comprising a pair of mutually parallel guide walls connected with said inner surface, said pair of guide walls straddling said portal and being equidistantly spaced from a center of said inner periphery, said concave guide wall being connected to said pair of guide walls.

3. The cover of claim 2, said means for connecting comprising:
   an annular slot being formed in said inner periphery adjacent said equitorial terminus; and
   said base member having a perimeter, said base member having tab means located at said perimeter for snappingly interfacing with said annular slot.

4. The cover of claim 3, wherein said tab means comprises a plurality of tabs, each tab curvably following a respectively adjoining portion of said perimeter, each tab comprising:
   a lower chamfer;
   an upper chamfer; and
   an apex between said lower and upper chamfers, wherein said apex is disposed radially outward with respect to said perimeter;
   wherein each tab is resiliently deformable in an inwardly radial direction with respect to said perimeter.

5. The cover of claim 4, wherein said plurality of tabs comprises three tabs equidistantly spaced around said perimeter.

6. The cover of claim 4, wherein said portal has a flat face generally perpendicular to a plane defined by said equitorial terminus.

7. The cover of claim 6, wherein said portal comprises a flat-faced arch.

8. The cover of claim 4, wherein when said base member is connected with said cover member, said perimeter is juxtaposed said inner periphery such that said base member is substantially flushly received into said cover member.

9. The cover of claim 6, wherein said selected shape is a generally hemispheric dome shape.

10. The cover of claim 6, wherein said selected shape is a generally curvaceous shape having a rounded nose and a flat face, wherein said portal is located at slid flat face.

11. A sun visor apparatus for being connected to a roof of a motor vehicle, comprising:

a sun visor;

a pivot rod having a main portion, an end portion, and an elbow therebetween, wherein said sun visor is pivotally mounted to said main portion of said pivot rod;

means for connecting said end portion rotatably to a roof of a vehicle;

a base member having a central aperture for receiving therethrough said end portion;

means for connecting said base nonrotatably to the roof;

a cover member having a cover wall having an exterior surface of a selected shape, said cover member having an equitorial terminus, said cover member having an inner periphery formed at said equitorial terminus, said cover wall having a portal formed therethrough, said cover member having an interior hollow defined by an internal surface, said cover member further having a concave guide wall connected with said inner surface in concentric relation with respect to said inner periphery; and means for connecting said cover member to said base member so that said cover is rotatable in relation to said base member;

wherein when said base member is connected to said cover member, the elbow is covered by said cover member, wherein said end portion abuts said concave guide wall and said main portion exits said cover member through said portal; and wherein when said pivot rod is rotated with respect to the roof, said cover member rotates with said pivot rod.

12. The sun visor apparatus of claim 11, further comprising a crush feature comprising a pair of mutually parallel guide walls connected with said inner surface, said pair of guide walls straddling said portal and being equidistantly spaced from a center of said inner periphery, said concave guide wall being connected to said pair of guide walls; wherein said main portion abuts said pair of guide walls.

13. The sun visor apparatus of claim 12, said means for connecting comprising:

an annular slot being formed in said inner periphery adjacent said equitorial terminus; and said base member having a perimeter, said base member having tab means located at said perimeter for snappingly interfacing with said annular slot.

14. The sun visor apparatus of claim 13, wherein said tab means comprises a plurality of tabs, each tab curvably following a respectively adjoining portion of said perimeter, each tab comprising:

a lower chamfer;

an upper chamfer; and an apex between said lower and upper chamfers, wherein said apex is disposed radially outward with respect to said perimeter;

wherein each tab is resiliently deformable in an inwardly radial direction with respect to said perimeter.

15. The sun visor apparatus of claim 14, wherein said plurality of tabs comprises three tabs equidistantly spaced around said perimeter.

16. The sun visor apparatus of claim 14, wherein said portal has a flat face generally perpendicular to a plane defined by said equitorial terminus.

17. The sun visor apparatus of claim 16, wherein said portal comprises a flat-faced arch.

18. The sun visor apparatus of claim 14, wherein when said base member is connected with said cover member, said perimeter is juxtaposed said inner periphery such that said base member is substantially flushly received into said cover member.

19. The sun visor apparatus of claim 16, wherein said selected shape is a generally hemispheric dome shape.

20. The sun visor apparatus of claim 16, wherein said selected shape is a generally curvaceous shape having a rounded nose and a flat face, wherein said portal is located at said flat face.

* * * * *